United States Patent [19]

Krishnan et al.

[11] Patent Number: 4,918,597
[45] Date of Patent: Apr. 17, 1990

[54] ADAPTIVE INTERFACE FOR TRANSFERRING SEGMENTED MESSAGE BETWEEN DEVICE AND MICROCOMPUTER ON LINE DIVISION MULTIPLEXED BUS

[75] Inventors: Iyengar N. Krishnan, Milford; Herbert J. Toegel, Middlebury, both of Conn.

[73] Assignee: Alcatel USA Corp., New York, N.Y.

[21] Appl. No.: 682,035

[22] Filed: Dec. 14, 1984

[51] Int. Cl.[4] .................. G06F 13/12; G06F 13/28; G06F 13/42; G06F 15/16
[52] U.S. Cl. .................. 364/200; 364/242.3; 364/238.3; 364/238.2; 364/239; 364/239.7; 364/254; 364/254.3; 364/241.9; 364/251.3; 364/259; 364/259.7
[58] Field of Search .................. 364/200, 900; 370/58, 370/68, 104

[56] References Cited

U.S. PATENT DOCUMENTS

| | | | |
|---|---|---|---|
| 4,130,883 | 12/1978 | Hazelton | 364/900 |
| 4,133,030 | 1/1979 | Huettner et al. | 364/200 |
| 4,156,798 | 5/1979 | Doelz | 364/200 |
| 4,200,936 | 4/1980 | Borzcik et al. | 364/900 |
| 4,355,388 | 10/1982 | Deal, Jr. | 370/104 |
| 4,387,433 | 6/1983 | Cardenia | 364/200 |
| 4,396,995 | 8/1983 | Grau | 364/900 |
| 4,403,282 | 9/1983 | Holberger et al. | 364/200 |
| 4,414,620 | 11/1983 | Tshchimoto et al. | 364/200 |
| 4,439,826 | 3/1984 | Lawrence | 364/200 |
| 4,455,622 | 6/1984 | Loskorn | 364/900 |
| 4,458,313 | 7/1984 | Suzuki et al. | 364/200 |
| 4,509,115 | 4/1985 | Manton et al. | 364/200 |
| 4,528,626 | 7/1985 | Dean et al. | 364/200 |
| 4,538,224 | 8/1985 | Peterson | 364/200 |
| 4,597,074 | 6/1986 | Demichelis et al. | 370/58 |
| 4,604,682 | 8/1986 | Schwan et al. | 364/200 |
| 4,654,654 | 3/1987 | Butler et al. | 370/85 |

FOREIGN PATENT DOCUMENTS 0026083 1/1981 European Pat. Off.

OTHER PUBLICATIONS

"DS 714/81, A New Telegraph and Data Processor" Philips Telecommunication Review, Band 34, Nr. 3, Oct., pp. 122-135.
IBM Technical Disclosure Bulletin, Band 26, Nr. 10A, Mar. 1984, pp. 5199-5206; Band 14, Nr. 3, Aug. 1971, pp. 799-800.
"Digital Data Switching Control System" Review of Electrical Communication Laboratories Band 28, Nr. 5-6, May-Jun. 1980, pp. 338-349.

Primary Examiner—Raulfe B. Zache
Assistant Examiner—Emily Y. Chan
Attorney, Agent, or Firm—Peter C. Van Der Sluys

[57] ABSTRACT

An interface for use with a microcomputer is provided with memory that in one operating mode is used as a first-in first-out buffer, and in a second operating mode allows the direct data transfer across the interface. The interface also includes a means for selecting the operating mode thereof.

6 Claims, 3 Drawing Sheets

ADAPTIVE INTERFACE FOR TRANSFERRING SEGMENTED MESSAGE BETWEEN DEVICE AND MICROCOMPUTER ON LINE DIVISION MULTIPLEXED BUS

CROSS-REFERENCE TO RELATED APPLICATIONS:

This application is related to the following U.S. patent applications: Ser. No. 682,030; Ser. No. 682,033; Ser. No. 682,034; Ser. No. 682,228; Ser. No. 682,038 now U.S. Pat. No. 4,638,474 all filed on even date herewith;and Ser. No. 722,894 now U.S. Pat. No. 4,653034 file on Apr. 12, 1985. All of the above applications are assigned to the assignee hereof.

BACKGROUND OF THE INVENTION

The present invention generally relates to an adaptive interface for use with a microcomputer and, in particular, relates to such an interface having means for selecting the operating mode thereof.

The advent of the microcomputer has revolutionized many industries, not the least of which is the telecommunication industry. The telecommunication industry has been impacted first by the increasing plethora of subscriber devices to which service must be extended; and second, by the available microcomputers that can be integrated into the present and future switching systems to provide the services demanded.

Historically, telecommunication switching systems have been centralized, i.e. a central computer is provided to set up and tear down all communication paths, execute all protocol conversions and provide all maintenance and monitoring services. However, the centralized architecture has, inter alia, the severe drawback of catastrophic failure to every subscriber in the event of component failure in the central exchange. In addition, in order to update or modernize such a central exchange a very costly redesign of the entire network is usually necessary. Clearly, such centralized systems are generally unable to maintain pace with technological advancements such as the microcomputer.

The spectre of a paralytic catastrophe lead to the development of a distributively controlled switching network wherein a digital switching network is provided with a plurality of autonomous terminal interfaces. The autonomous terminal interfaces are then connected to a plurality of subscribers. In such a distributively controlled network the terminal interfaces are provided, usually via a microcomputer, with the command and control instructions necessary to establish communication links between subscribers of different terminal interfaces as well as among subscribers to the same terminal interface. Thus, the spectre was dispelled since any failure at any terminal interface produced only a minimal effect with regard to the overall subscribers to the network. One such distributively controlled switching network is the ITT System 12 Digital Exchange.

Nevertheless, as the development of microcomputers and switching systems continues there is an increases need for an interface to a microcomputer that can be adapted to permit microcomputers of different capabilities to be interconnected to, for example, a switching apparatus.

SUMMARY OF THE INVENTION

Accordingly, it is one object of the present invention to provide an adaptive interface for use with a microcomputer.

This object is accomplished, at least in part, by an adaptive interface having means for selecting the data transfer operating mode thereof.

Other objects and advantages will become apparent to those skilled in the art from the following detailed description read in conjunction with the appended claims and the drawings attached hereto.

DETAILED DESCRIPTION OF THE INVENTION

Figure 1:
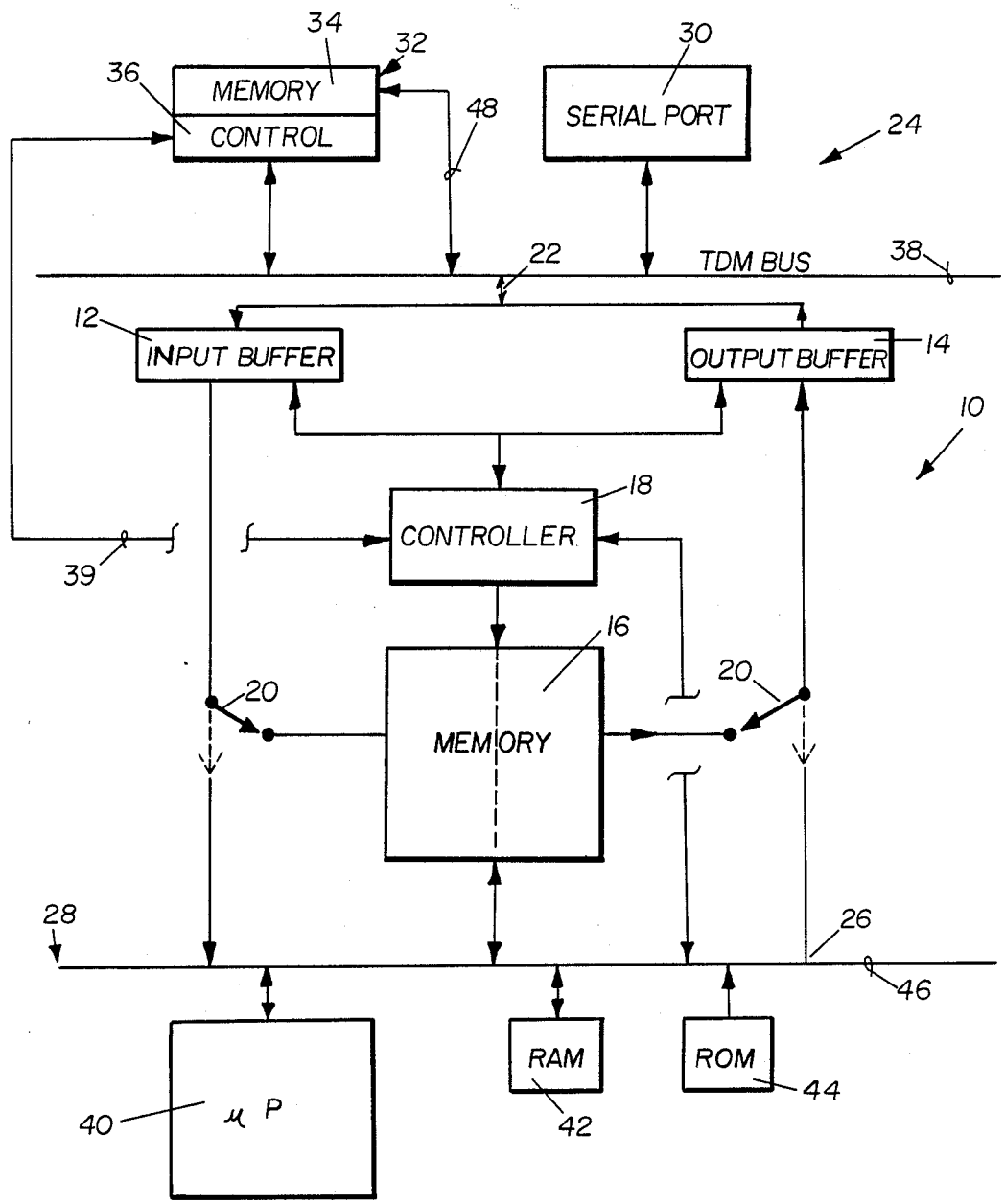
FIG. 1 is a block diagram of an interface embodying the principles of the present invention.

An adaptive interface, generally indicated at 10 in FIG. 1 and embodying the principles of the present invention, includes an input buffer 12, an output buffer 14, a storage medium 16 and an interface controller 18. The interface 10 further includes means 20 for selecting the operating mode thereof.

In one embodiment, the interface 10, as shown in FIG. 1, is interconnected, via a first port 22 thereof, to an apparatus 24 for establishing communication paths and, via a second port 26 thereof, to a microcomputer 28. The apparatus 25 includes a plurality of serial ports 30 and an intelligent switch 32 having a memory 34 and a switch controller 36. The ports 30 and the switch 32 are interconnected via a time-division-multiplexed (TDM) bus 38. One such apparatus 24 is described and discussed in U.S. patent application Ser. No. 682,228 entitled "Apparatus for Establishing Communication Paths" filed on even date herewith and assiged to the assignee hereof now U.S. Pat. No. 4,639,910. The above-referenced patent application is deemed fully incorporated herein by reference.

As fully discussed therein, in a particular embodiment, the transport of information along the TDM bus 38 is organized by frames. Each frame is subdivided into thirty-two channels each of which is further subdivided into sixteen words. Hence, there are 512 words per frame, each word, preferably, being represented by 16 bits of information. The movement of information via a TDM bus 38 is known and need not be discussed in detail other than to point out that such an apparatus 24 includes a master clock, not shown in the drawings, that provides strobe signals to the various destinations to indicate the arrival, i.e. prepare for, of the appropriate word, i.e. time slot, having information therefor. For reasons more fully discussed below, in the preferred embodiment, the switch controller 36 is adapted to provide system specific information to the interface controller 18 via, for example, an eight bit bus 39.

As used herein the phrase "intelligent switch" or the idiomatic equivalent thereof is taken to mean a device adapted to dynamically assign, or switch, a plurality of communication paths. One particular embodiment of the intelligent switch 32 includes a scratch pad memory 34 of the type described and discussed in U.S. patent application Ser. No. 682,033 entitled "Apparatus and Method for Providing Dynamically Assigned Switch Paths" filed on even date herewith and assigned to the assignee hereof now U.S. Pat. No. 4,656,626. In addition, the intelligent switch 32 includes a means for controlling, shown herein as controller 36 the path assignments in the scratch pad memory 34. One switch controller 36 particularly adapted to operate with the scratch pad memory 34 shown in the immediately above mentioned patent application is fully described in U.S. patent application Ser. No. 682,030 entitled "Switch Controller," filed on even date herewith and assigned to the assignee hereof. The two above-mentioned patent applications are deemed incorporated herein by reference.

The microcomputer 28, in one embodiment, includes a microprocessor portion 40, a random access memory 42 (RAM) and a read only memory 44 (ROM) interconnected via a local bus 46. Generally, microcomputers can be classified, inter alia, by the ability thereof to accept "direct memory access" handshake signals from other intelligent devices to allow, for example, the direct access to the microcomputers random-access-memory by the other intelligent device. The microcomputers of this classification can thus be used to transfer data rapidly by using known "direct memory access" techniques. Preferably the microcomputers chosen, in this classification, are sixteen bit devices, i.e. each "word" processed thereby includes sixteen bits of information. One typical microcomputer satisfying this classification is the 8086, manufactured and marketed by INTEL Corp. of Santa Clara, Calif. Microcomputers that are not provided with the handshake capability are usually 8 bit devices, i.e. each "word" processed thereby includes only 8 bits of information. One such microcomputer is the 8051, manufactured and marketed by INTEL Corp. of Santa Clara, Calif. Usually, since direct memory access techniques are not available for such a device data is transferred by "first-in-first-out" (FIFO), or buffer, mode techniques. Such techniques are somewhat slower than direct memory access techniques since all data must pass through an intermediate buffer. Hence, the extra read and write steps necessary to pass data across the intermediate buffer extend the time required to move any data processed by such a microcomputer. Naturally, microcomputers that operate on larger words, such as a 32 bit device, can also be used with the interface 10 without undue difficulty.

In the preferred embodiment, the input and output buffers, 12 and 14, respectively, are sixteen bit latching registers. Thus, in response to a strobe from the controller 18, a word of up to sixteen bits is read from, or written onto, a designated word slot of the TDM bus f38. The designation of word slots is effectively controlled by the apparatus 24 and, in this embodiment, includes a memory interconnection bus 48 whereby data is read from, or written into, the data portion of the memory 34. With reference to the above-identified application Ser. No. 682,033 entitled "Apparatus and Method for Providing Dynamically Assigned Paths" now U.S. Pat. No. 4,639,910 the data portion is the RAM of the CAM/RAM/CAM array.

Figure 2:
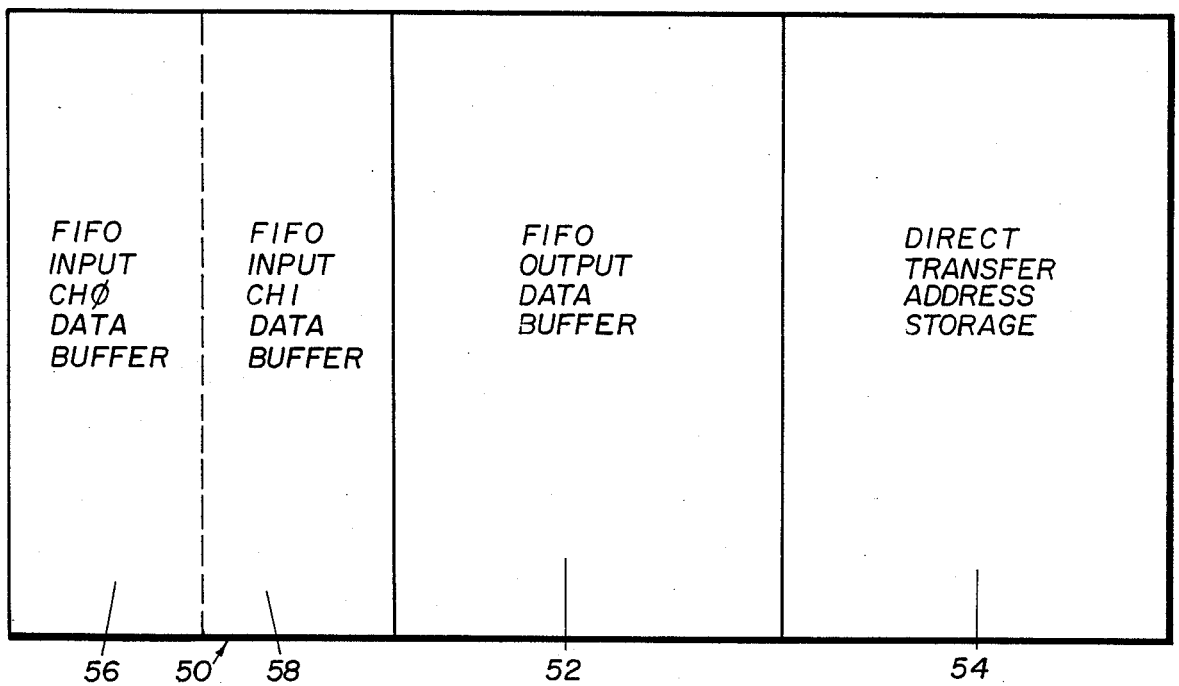
FIG. 2 is a block diagram of the storage medium shown in FIG. 1.

The storage medium 16, shown in more detail in FIG. 2, includes an input data buffer 50, an output data buffer 52 and an address storage medium 54. As shown, and as more fully discussed below, the input data buffer 50 includes a first input data buffer 56, i.e. channel zero and a second input data buffer 58, i.e. channel one. In one embodiment, the input data buffer 50 is a 256 bit random access memory and, if each word slot on the TDM bus 38 transfers eight bit words into the input buffer 12, is effectively a 16×8 bit input channel zero data buffer 56 and a 16×8 bit input channel one data buffer 58. The output data buffer 52 and the address storage medium 54 are each 256 bit random access memories.

Essentially, the interface 10 is adapted to operate in either a FIFO (buffer mode) or a direct data transfer mode. In the FIFO mode, the input and output buffers, 12 and 14, respectively, exchange data with the input data buffer 50 and the output data buffer 52, respectively. This operating mode is shown by the solid line positions of selecting means 20 in FIG. 1. In the direct data transfer mode the means 20, shown via the dashed line, positions, connect the input and output buffers, 12 and 14, respectively, directly to the local bus 46 of the microcomputer 28.

To provide a clearer understanding of the subsequent discussion of the controller 18, a brief operational discussion of the interface 10 is provided hereinafter. In the FIFO mode of operation, it is initially assumed that each word slot on the TDM bus 38 contains an eight bit word and that the interface 10 is assigned a number of such time slots each frame. In addition, each message to be transferred across the interface, regardless of the direction, will be conveyed in segments, each segment being equal to one word and conveyed in one of the assigned number time slots. Further, each consecutive message segment will be located at the same predesignated word slot in consecutive frames. In such an arrangement, the microcomputer 28 can be either an eight or sixteen bit device. In such an operating mode, the input data buffer 50 is used as two 16×8 bit buffers, 56 and 58. Hence, segments from two different messages can be virtually simultaneously accepted by the input data buffer 50 and serviced by the microcomputer 28. The microcomputer 28, when providing messages to the TDM bus 38 via the output buffer 14 then provides 8 bit words into one of the assigned number of word slots per frame.

In the event that the TDM bus 38 is adapted to carry 16 bit words, the input data buffer 50 would, if a sixteen bit microcomputer is connected, accept the sixteen bit words but would then be able to only service one message at any given time. That is, the distinction between channel zero and channel one would no longer exist since each word would take a 16 bit portion of the input data buffer 50.

The operation of the interface 10 in the direct data transfer mode is essentially identical to that of the apparatus described in U.S. patent application Ser. No. 682,034 entitled "Interface for Direct Data Transfer" filed on even date herewith and assigned to the assignee hereof. This application is hereby deemed fully incorporated by reference herein. Essentially, data is transferred directly between the microcomputer 28 and the buffers, 12 and 14, without any intermediate read or write steps.

Figure 3:
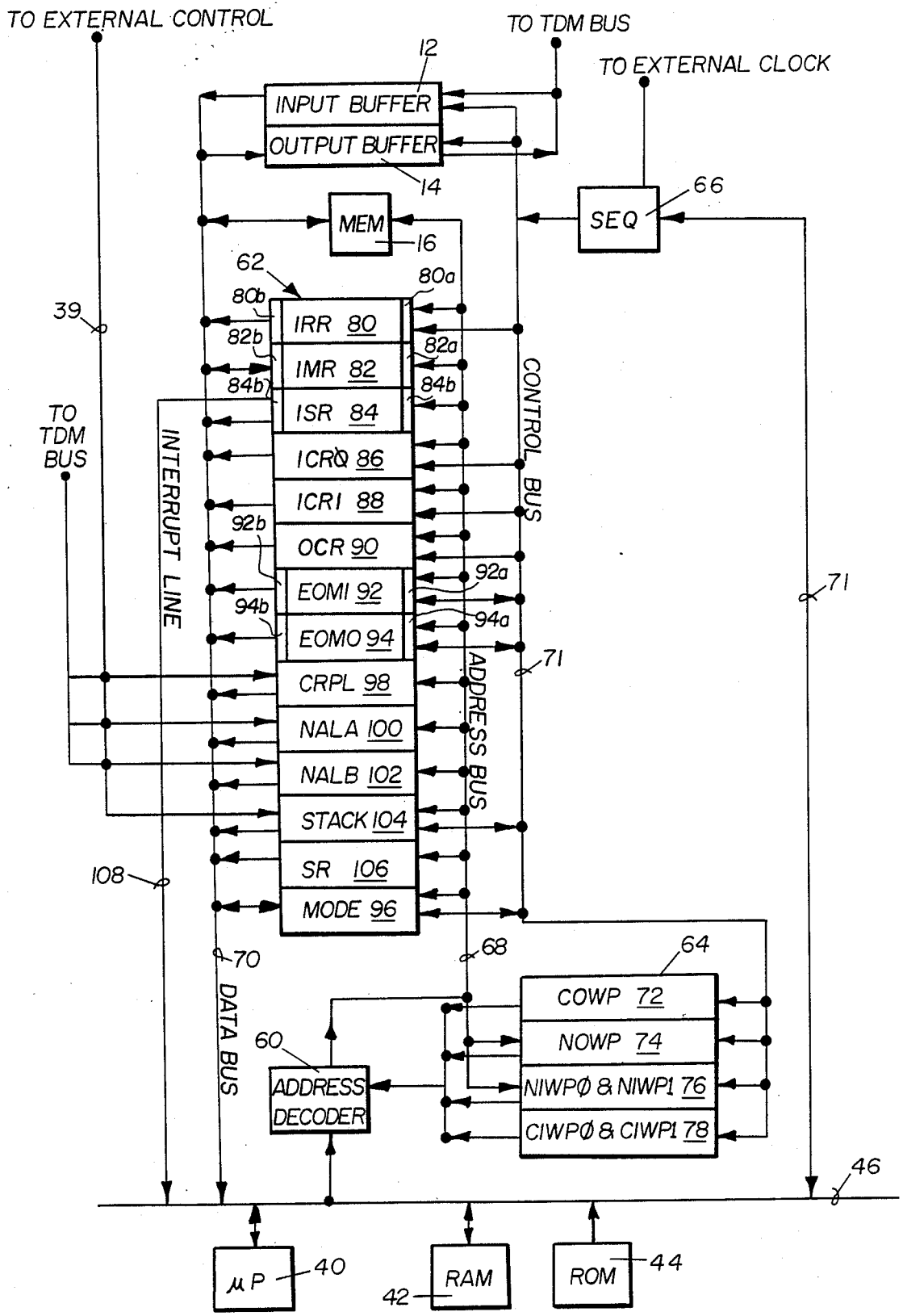
FIG. 3 is a block diagram of an interfce controller adapted for use as shown in FIG. 1.

One embodiment of the interface controller 18 is shown in FIG. 3. As shown therein, the controller 18 includes an address decoder 60, a plurality of registers 62, a plurality of counters 64 and a sequencer 66. The address decoder 60 is, preferably, memory mapped to allow direct access to the registers 62, counters 64 and the storage medium 16 by the microcomputer 28. As shown, the address decoder 60 interconnects to each of the registers 62, the counters 64 and the storage medium 16 via address bus 68 and is accessed by the microcomputer 28 via the local bus 46 thereof. By memory mapped it is meant that the microcomputer 28 via, for example, the ROM 44 thereof, can retrieve an address from the ROM 44. The address is presented on the pins connecting to the address decoder 60. The address decoder 60 then latches the addressed destination to the microcomputer 28 whereafter the microcomputer 28 executes a read or write to that latched destination via the data bus 70 thereof. As known, the address and data buses, 68 and 70, respectively, have the signals thereon multiplexed on the local bus 46 of the microcomputer 28. The strobes are provided by the sequencer 66 via control bus 71.

Throughout the following discussion of the various registers 62 it is understood that the phrase "set" refers to any change in the logic level of a bit in a register in response to an event. The phrase "reset" refers to the return to the previous logic level of a particular bit that has been changed in response to an event, i.e., that bits starting logic level before any events. It is immaterial whether the original, or starting, logic level is a binary one or a binary zero. Further, reference to binary ones or zeros does not imply any particular voltage or current and a set or reset implies only a change thereof.

The counters 64 include counters, 72, 74, 76, and 78. The counters 64 can be designated as a current output word pointer (COWP) 72, a next output word pointer (NOWP) 74, a next input word pointer (NIWP) 76 and a current input word pointer (CIWP) 78. The COWP 72 is incremented each frame and points to the next word to be transferred to the TDM bus 38 via the output buffer 14. The NOWP 74 is also incremented each frame and points to the memory location of the word to be outputted as the "current word" during the next frame. The NIWP 76, preferably, in the sixteen bit TDM mode, points to the next word to be read by the microcomputer 28 from the input data buffer 50. The CIWP 78 points to the word currently being accessed by the microcomputer 28. In the eight bit TDM mode a NIWP 76 and CIWP 78 is provided for each channel, i.e. one for each input channel, 56 and 58, in the input data buffer 50. The counters 64, during message segment transfers, change at each frame and provide continuously updated addresses to the address decoder 60.

The registers 62 include interrupt registers, 80, 82 and 84, word counts, or address incrementing, registers, 86, 88 and 90, end of message registers, 92 and 94, a mode register 96 and a plurality of system specific registers, 98, 100, 102, 104 and 106. The interrupt registers can be designated as an interrupt request register (IRR) 80, an interrupt mask register (IMR) 82 and an interrupt service register (ISR) 84. The word count registers can be designated, for the FIFO mode, as input count register for channel zero (ICR0) 86, an input count register for channel one (ICR1) 88, an output count register (OCR) 90. The end of message registers are designated as end of message on input (EOMI) 92 and end of message on output (EOMO) 94. The system particular registers can, for example, be designated as a command reply register (CRPL) 98, a first network alarm register (NALA) 100, a second network alarm register (NALB) 102, an error, or not acknowledged, register (STACK) 104 and a stack counter register (SR) 106.

The IRR 80 is an eight bit read only register. In one embodiment, the bit positions are defined as follows: (a) an alarm bit, which alarm bit is set under various predefined conditions such as a clock or synchronizing failure; (b) an end of message on output 80b, (c) an end of message on input 80a, these two bits are reset when the EOMO 94 and EOMI 92, respectively, are reset; (d) a stack bit which is a logic level 1 only when the stack register 104 is other than zero; (e) two alarm bits responsive to alarms registered in NALA 100 and NALB 102, (f) two bits are used to indicate the "almost overflow" on input or "almost underflow" on output conditions.

The IMR 82 is an eight bit register and can be read from, or written to, by the microcomputer 28. When a bit such as one of bits 82a and 82b is set therein the setting of a corresponding bit in the IRR 80 is prevented from causing an interrupt signal to be sent to the microprocessor 28. Thus, under conditions where the microcomputer 28 is performing a program tha, for example, has priority, the prioritizing can be accomplished by setting the lower priority task bits in the IMR 82 to ensure that a lower priority task will not interfere with the presently executing program.

The ISR 84 is a read only eight bit register and, when a bit such as one of bits 84a and 84b therein is set, generates an interrupt signal via an interrupt line 108 to the local bus 46 of the microcomputer 28. The bits in the ISR 84 will be set in response to a logical AND of the corresponding bits in the IRR 80 with the inverse of the corresponding bits in the IMR 82.

The ICR0 and ICR1 registers, 86 and 88 respectively, are eight bit read only registers and indicate the number of words in each of the input data buffers, 56 and 58. In the FIFO mode, the values are incremented each time a word is entered into the input data buffer 50 and, when a preselected number of words are stored, the corresponding bit in the IRR 80 is set. Similarly, the OCR 90 is an eight bit read only register that is decremented each time a word is outputed. When the count reaches a preselected threshold an interrupt request bit is set.

In the direct data transfer mode one of the ICR registers, 86 or 88, and the OCR 90 are, effectively, the input and output address incrementers, IAI and OAI, respectively, discussed in the above referenced U.S. patent application Ser. No. 682,034.

The EOMI 92 and EOMO 94 registers are eight bit read only registers having bit positions such as 92a, 92b, 94a and 94b. These registers, 92 and 94, ensure that each complete message is separated from subsequent messages. When an end of message flag enters the input buffer 12 the corresponding bit in the IRR 80 is set and no further message segments will be accepted by the input buffer 12 until that bit is reset. When an end of message flag on output is detected a new message can be started only after the EOMO bit is reset.

In the preferred embodiment, the mode register 96 is an eight bit register and can be both read from, or written to, by the microcomputer 28. The eight bits preferably correspond to the following information; (a) 2 bits are used to indicate a threshold for the "almost overflow" interrupt; (b) 2 bits are used to indicate a threshold for the "almost underflow" interrupt; (c) one bit is used to indicate to the interface 10 to operate in either an 8 bit mode or a 16 bit mode; (d) one bit is used to select either the FIFO, or buffer, mode or the direct data transfer mode; and (e) one bit is used in the DMA mode, to hold a particular address in the address storage medium 54 until valid information is to be transferred.

The CRPL 98, NALA 100 and NALB 102 are eight bit read only registers and are set according to instructions provided in predesignated reply or alarm time slots in each frame on the TDM bus 38. In this fashion, the microcomputer 28 can be used to execute prespecified system oriented programs, for example, to minimize the consequences of malfunctions. In addition, the STACK 104 is a plurality, such as eight, eight bit read only register that effectively record each failure of a port or channel to complete an instruction. That is, if a particular source forwards an instruction and that instruction is not executed, a signal is registered in the STACK 104. The not acknowledged signal is provided to the STACK 104 via an eight bit external control bus from the switch controller 36 of the intelligent switch 32.

The SR 106 register is an eight bit read only register that counts the number of entries provided to the STACK 104 and sets a bit in the IRR 80 accordingly.

The sequencer 66 is, for all intents and purposes, a state machine. As well known, a state machine is a controller the next state of which depends only on its present state and its present inputs. Such state machines can be implemented by use of readily available programmable logic arrays (PLAs) or by programmable read only memories (PROMs). Preferably, however, the controller 18 of the interface 10 is implemented using large scale integration (LSI) techniques and satisfies the state diagram shown in FIG. 4. In the preferred embodiment, the transition between states occurs upon receipt of a clock signal from an external clock, not shown in the drawings. Usually, the clock signal is provided by a master clock associated with the system connected to the first port 22 whereby the state transitions of the interface are coordinated with that system.

Figure 4:
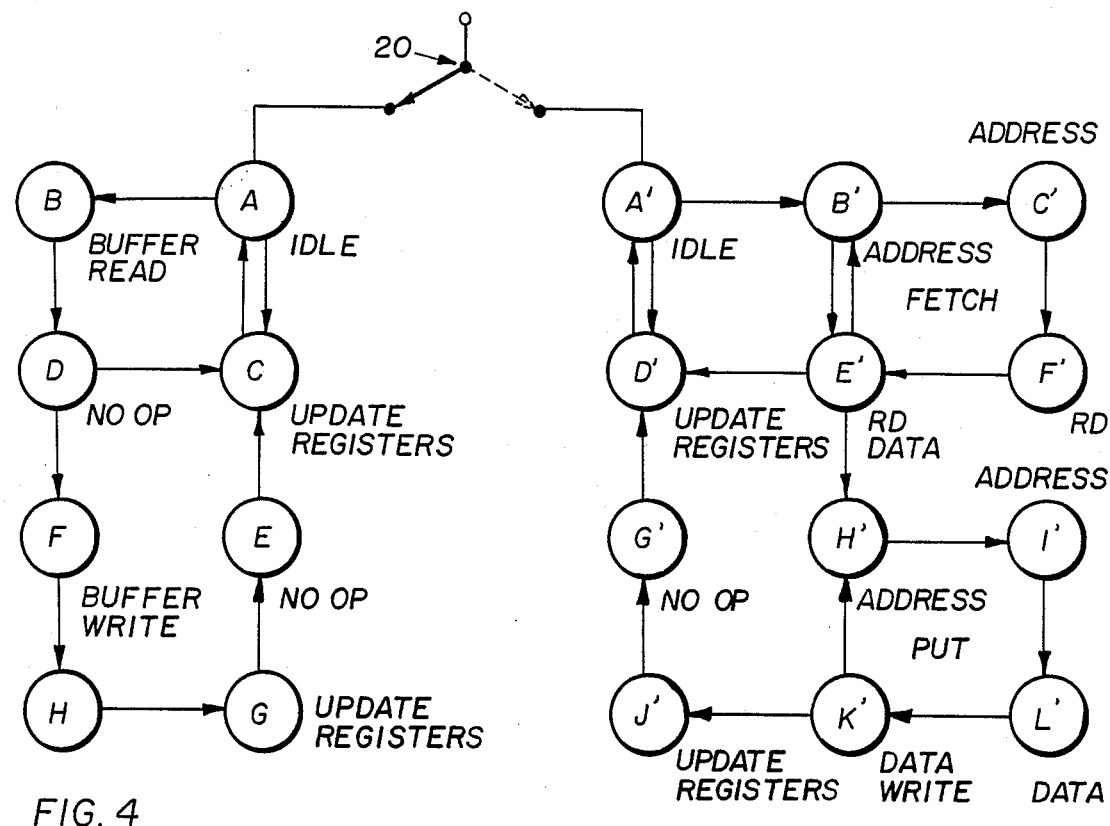
FIG. 4 is a state diagram for a sequencer adapted for use as shown in FIG. 3.

Referring now to FIG. 4, there is shown therein a state diajgram of the various states involved in the data transfer between the TDM bus 38 and the microcomputer 28. The means 20 is set by the above mentioned bit in the mode register 96 to either the FIFO, or buffer, mode or the direct data transfer mode whereupon the sequencer 66 executes one or the other state sequences shown in FIG. 4.

In the buffer mode indicated by the solid line switch position, the state A is representative of an idle state. From the idle state, when strobed, the state is either shifted to state B or state C. As shown, state C is an updating of all registers 62 and occurs after each transfer of data. State B is a buffer read state during which the microcomputer 28 read the information from the buffer 50. On the next strobe the microcomputer 28 is set to no operation state D and, on the next strobe, shifts to either state C, which is a register update state, or state F, a buffer write. Hence, if information is available, it is first read in from the TDM bus 38, if information is to be sent out, it occurs on the next set of strobes. After the buffer write state occurs, the end of message registers, at state G, are updated or interrupts are generated. Thereafter, the sequencer moves to a state E, which is also a no operation state. The no operation states, D and E, are designed to ensure stepwise synchronization with both the internal interface operation and the TDM bus 38. Thereafter, the sequencer 66 moves to state C where the updating of registers 62 occurs and thereafter returns to the idle state A.

Basically, the above state diagram is adapted to provide the following method for operation during the FIFO, or buffer, mode. First, data is extracted from the TDM bus 38 on either channel 0 or channel 1 and transferred into the input data buffer 50. The input data buffer 50 is emptied by the microcomputer 28 at either an end of message interrupt or an "almost full" interrupt. Data is outputted from the microcomputer 28 by a write step from the microcomputer 28 into the output data buffer 52 and a subsequent write step from the output data buffer 52 into the output buffer 14 whereafter it is injected onto the TDM bus 38 in the appropriate time slot corresponding to the destination channel.

In the direct data transfer mode state A' is an idle state which signifies that the interface 10 is ready to interact with the TDM bus 38. When strobed the sequencer 66 moves to state B' whereupon the address of the next message segment of a predetermined word slot is acquired by the microcomputer 28. At state C' the address is secured by the microcomputer 28 and the message segment is, at state F', directly transferred from the RAM 42 to the output buffer 14. At state E' the message segment in the output buffer 14 is injected, or read into, the appropriate word slot or the TDM bus 38.

On the next strobe, if there is no incoming message segment, the registers 62 are updated, during state D'. If, however, a message segment is arriving in the next designated word slot the state machine shifts to state H'. In state H' the microcomputer 28 acquires the address associated with the word slot having an incoming message segment and, in state I' presents that address to the RAM 42.

During states L' and K' the message segment is written into the input buffer 12 and then, at K', directly written into the RAM 42. The next state, state J' is used to update the registers 62. The following transition, to state G', is, effectively, a no operation state but is used to maintain the state machine in sequence with the clock pulse.

As shown, when at either state E' during a "fetch" or state K' during a "put" the sequencer 66 is able to shift to state B' or H' respectively. Such state transitions can be implemented to allow the interface 10 having a 16 bit microcomputer 28 to be readily used with an eight bit system. In such an eight bit system it would thus be desirable to read or write two eight bit words to maximize the efficiency of the microcomputer 28.

Accordingly, the interface 10 can interface either an eight bit or sixteen bit microcomputer, with or without "direct memory access" capability, to an eight or sixteen bit intelligent device.

The present invention has been described herein with regard to a particular exemplary embodiment and is not deemed limited thereto as other configurations and uses may be developed which do not depart from the spirit and scope of this invention. Consequently, the present invention is deemed limited only by the appended claims and the reasonable interpretation thereof.

What is claimed is:

1. An interface for connecting a device and a microcomputer, said interface comprising:
 a first means for transporting data between a first port, for connection to said device, and a second port for connection to said microcomputer, said first means including a data storage medium, said data being a segment of a segmented message, the last segment of said segmented message including an end of message signal;
 a second means for transporting data between said first port and said second port, said second means inlcuding an address storage medium;
 means for selecting either said first means or said second means for transporting data across said interface, said second means being selected when the microcomputer has direct memory access capability;

means, connected to said first and second means and responsive to said end of message signal, for registering an end of said segmented message, said end of message registering means including separate means for registering the end of a message to said microcomputer, and the end of a message from said microcomputer, so that the microcomputer can detect when a message is complete by reading said end of message registering means;

means, responsive to a signal from said end of message registering means for registering a request to interrupt said microcomputer when an end of message is registered; and means connected to said interrupt request registering means for selectively providing said interrupt requests, said selective providing means inlcuding an interrupt mask register having bit positions set by said microcomputer, and an interrupt service register connected to said interrupt request registering means and said interrupt mask register for receiving bits therefrom and having bit positions, said bit positions being set by said interrupt service register as a logical AND of the setting of the corresponding bits in said interrupt request registering means and the inverse of the setting of the corresponding bits in said interrupt mask register, said interrupt service register providing said interrupt request based on the setting of said bits.

2. An interface for connecting a device on a time division multiplexed bus to a microcomputer capable of handling words having a maximum word length of a predetermined number of bits, said interface comprising:

a first means for transporting data between a first port, for connection to said time division multiplexed bus, and a second port for connection to said microprocessor, said first means including a data storage medium;

a second means for transporting data between said first port and said second port, said second means including an address storage medium, said address storage medium for storing a plurality of addresses, said plurality of addresses includes a first group of addresses for pointing to locations in a memory of said microcomputer for storing data from said time division multiplexed bus and a second group of addresses for pointing to locations in said memory for storing data to said time division multiplexed bus, each one of said first group of addresses relating to a different message from said time division multiplexed bus, and each one of said second group of addresses relating to a different message to said time division multiplexed bus;

means responsive to a signal from said microcomputer for selecting either said first means or said second means for transporting data across said interface, said data being in the form of messages transferred in segments, the last segment of a message including an end of message signal;

said data storage medium including means for virtually simultaneously transferring message segments of a plurality of messages between said first port and said second port when said message segments contain a number of bits equal to or less than one-half said predetermined number of bits so that the microcomputer can virtually simultaneously receive and process segments of a plurality of messages and utilize its maximum capability;

means, responsive to the end of message signal, for registering the end of a message, including a first register having a plurality of bits, each said different message from said time division multiplexed bus having a bit corresponding thereto, said bit being set in response to the end of message signal of said message; and a second register having a plurality of bits, each said different message to said time division multiplexed bus from said second port having a bit corresponding thereto, said bit being set in response to the end of message signal of said message.

3. Interface as claimed in claim 2, further comprising:

register means, having bit positions and being connected to said first and second registers and responsive to signals therefrom indicative of the setting of bits in said first and said second registers, for setting its bit positions for registering a request for an interrupt signal to be sent to said microcomputer.

4. Interface as claimed in claim 3, further comprising:

means connected to said register means for registering a request for an interrupt signal for selectively providing said interrupt requests, said selective providing means including an interrupt mask register having bit positions set by said microcomputer and an interrupt service register connected to said register means and said interrupt mask register for receiving bits therefrom and having bit positions, said bit positions being set by said interrupt service register as a logical AND of the setting of the corresponding bits in said register means and the inverse of the setting of the corresponding bits in said interrupt mask register said interrupt service register providing said interrupt request based on the setting of said bits.

5. An interface for connecting a device on a time division multiplexed bus to a microcomputer capable of handling words having a maximum word length of a predetermined number of bits, said interface comprising:

a first means for transporting data between a first port, for connection to said time division multiplexed bus, and a second port, for connection to said microcomputer, said first means including a data storage medium;

a second means for transporting data between said first port and said second port, said second means including an address storage medium, said address storage medium for storing a plurality of addresses, said plurality of addresses includes a first group of addresses for pointing to locations in a memory of said microcomputer for storing data from said time division multiplexed bus, and a second group of addresses for pointing to locations in said memory for storing data to said time division multiplexed bus;

means responsive to a signal from said microcomputer for selecting either said first means or said second means for transporting data across said interface, said data being in the form of messages transferred in segments, the last segment of a message including an end of message signal, said data storage medium including a first input data portion and a second data input data portion, said first and second input data portions simultaneously storing segments from said plurality of messages;

means for counting the number of segments stored in either said first or second input data portion, and for generating an interrupt signal for the microcomputer when the number of segments stored in either said first or said second input data portion exceeds preselected thresholds; and said data storage medium including means for virtually simultaneously transferring message segments of a plurality of messages between said first port and said second port when said message segments contain a number of bits equal to or less than one-half said predetermined number of bits so that the microcomputer can virtually simultaneously receive and process segments of a plurality of messages and utilize its maximum capability.

6. Interface as claimed in claim 5, wherein said interrupt signal generating means includes means for independently counting the number of message segments stored in said first and second data portion.

* * * * *